(12) United States Patent
Meier

(10) Patent No.: US 7,841,084 B2
(45) Date of Patent: Nov. 30, 2010

(54) GAS TURBINE COMPONENTS AND METHOD FOR MACHINING GAS TURBINE COMPONENTS

(75) Inventor: Reinhold Meier, Dorfen (DE)

(73) Assignee: MTU Aero Engines GmbH (DE)

( * ) Notice: Subject to any disclaimer, the term of this patent is extended or adjusted under 35 U.S.C. 154(b) by 181 days.

(21) Appl. No.: 12/196,626

(22) Filed: Aug. 22, 2008

(65) Prior Publication Data

US 2009/0274550 A1 Nov. 5, 2009

Related U.S. Application Data

(63) Continuation of application No. PCT/DE2007/000361, filed on Feb. 27, 2007.

(30) Foreign Application Priority Data

Mar. 9, 2006 (DE) .................... DE102006010927

(51) Int. Cl.
*F01D 5/18* (2006.01)
(52) U.S. Cl. ................. 29/889.2; 219/121.85; 427/259; 416/97 R; 416/241 R; 416/232
(58) Field of Classification Search ............... 416/97 R, 416/231 R, 232, 233, 241 A, 241 R; 29/889.2; 219/121.71, 121.85; 247/259, 272, 282; 427/259, 272, 282
See application file for complete search history.

(56) References Cited

U.S. PATENT DOCUMENTS

| | | | | |
|---|---|---|---|---|
| 4,873,414 A | | 10/1989 | Ma et al. | |
| 5,140,127 A | * | 8/1992 | Stroud et al. | ............ 219/121.71 |
| 5,902,647 A | | 5/1999 | Venkataramani et al. | |
| 5,914,060 A | * | 6/1999 | Flis et al. | ............... 219/121.71 |
| 6,251,315 B1 | * | 6/2001 | Reed et al. | ............ 219/121.71 |
| 7,067,447 B2 | * | 6/2006 | Campbell | .................... 501/152 |
| 7,302,992 B2 | * | 12/2007 | Chang et al. | .................. 164/45 |

FOREIGN PATENT DOCUMENTS

| | | |
|---|---|---|
| EP | 0 843 026 | 5/1998 |
| EP | 0 851 098 | 7/1998 |
| EP | 1236534 | 9/2002 |
| GB | 2382539 | 6/2003 |
| JP | 07279611 | 10/1995 |

OTHER PUBLICATIONS

International Search Report corresponding to International Application Serial No. PCT/DE2007/000361, mailed Jul. 18, 2007.

* cited by examiner

*Primary Examiner*—Ninh H Nguyen
(74) *Attorney, Agent, or Firm*—McAndrews, Held & Malloy, Ltd.

(57) ABSTRACT

The present technology relates to the problem that during diverse machining steps of application to the production or reconditioning of internally cooled gas turbine blades, an undesired effect may be had on sections of the gas turbine blades and proposes, as an improvement, to inject the cavity of the gas turbine blades before the machining steps with a plastic material which can be removed without trace, such as polystyrene, which can be subsequently removed again, in particular by heat.

16 Claims, 2 Drawing Sheets

GAS TURBINE COMPONENTS AND METHOD FOR MACHINING GAS TURBINE COMPONENTS

RELATED APPLICATIONS

This application is a continuation of International Application No. PCT/DE2007/000361 (International Publication Number WO/2007/101423), having an International filing date of Feb. 27, 2007 entitled "Gasturbinenbauteil Sowie Verfahren Zur Bearbeitung Von Gasturbinenbauteilen Im Rahmen Der Herstellung Oder Instandsetzung Dieser Gasturbinenbauteile" ("Gas Turbine Component And Method For Machining Gas Turbine Components During Production Or Reconditioning Of Said Gas Turbine Components"). International Application No. PCT/DE/2007/000361 claimed priority benefits, in turn, from German Patent Application No. 10 2006 010 927.9, filed Mar. 9, 2006. International Application No. PCT/DE/2007/000361 and German Application No. 10 2006 010 927.9 are hereby incorporated by reference herein in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present technology relates to gas turbine components and a method for machining gas turbine components. More specifically, the present technology relates to systems and methods for machining of gas turbine components during production and repair or reconditioning of these gas turbine components.

Gas turbine components haveing an internal cavity—subsequently referred to as first inner cavity—are already known. An example of such a configuration is a blade, like a guide vane or turbine blade of a gas turbine or of an aircraft engine, which is provided with a first inner cavity for cooling purposes. Such a first inner cavity, which can also be designed as a channel, an arrangement of several cooperating channels, a chamber and/or a chamber system, can have one or more undercuts and can then be connected to holes or slits, so that the entire arrangement of inner cavity and holes or slits permits air flow through the blade. Such blades are also referred to as internally cooled or internally air-cooled blades.

In the production and repair of such blades, a number of machining steps is typically carried out. For example, it can be prescribed that one of the machining steps conducted in the context of production is "casting" in the blade, in which the first inner cavity is formed in the context of this casting process. The first inner cavity, however, can also be formed in a different way. Holes or cooling holes or slits or cooling slits are generally introduced after formation of the mentioned first cavity. This can be so that by means of a mechanical machining method, like drilling, cooling holes are introduced that extend from the outer surface of the blade to the first cavity. Another possibility is to introduce such holes or slits by means of a laser. While it can be relatively easily ensured that the limitation section of the first cavity opposite the hole being formed will not be adversely affected or damaged during the mechanical drilling of a cooling opening, it is much more difficult to ensure during laser drilling. During mechanical drilling, an adverse effect on the mentioned opposite wall section can be simply avoided by controlling the drilling depth, however, during laser drilling, there is a not insignificant hazard that the laser radiation will produce undesired changes on the opposite wall section of the cavity limitation.

The effect area, or the area upon which the laser drilling is intended to have a drilling effect, is not only in the area in which the laser drilling influences, as laser drilling also affects the wall section of the first cavity opposite the laser drilling. It is desirable, however, to avoid or reduce the adverse effects or changes that occur in the opposite wall section as a result of laser drilling.

This problem of having effects occur in areas of the component, or the gas turbine component in which effects are undesired during the production or repair of gas turbine components by machining steps or by a machining tool, however, does not only exist during the mentioned laser drilling.

This problem can also occur, for example, during coating of gas turbine components—be it in the context of the manufacturing process or in the process of repair. If, for example, an internally air-cooled blade is at least partially de-coated in the context of repair work and then re-coated, there is a hazard that during this coating, the cooling air holes will be clogged or their cross-sectional areas at least reduced.

Here again, during a machining step, namely coating, an effect occurs on an area of the component or blade in which the corresponding effect is undesired.

The underlying task of the presently described technology is to devise a method for machining especially internally cooled or internally air-cooled gas turbine components, where the machining occurs during production or repair of these gas turbine components, in which the hazard of undesired or damaging effects is reduced or even avoided during the machining steps on the gas turbine component.

BRIEF SUMMARY OF THE INVENTION

According to the presently described technology, various embodiments of methods are proposed for machining a gas turbine component or components. The present technology also describes various embodiments of gas turbine components.

According to the present technology, a method is proposed for machining gas turbine components during the production or repair (reconditioning) of these gas turbine components, particularly internally cooled or internally air-cooled gas turbine components. A component is provided having at least a first internal cavity and is initially prepared. Then at least one first machining step is conducted on this component. To limit the area on which an effect occurs in the first machining step, before performing the at least first machining step, plastic material is introduced to the first cavity. This plastic material is removed again after the machining steps or the first machining step from the first cavity. As stated, a method for machining of gas turbine components is proposed; in this context, the gas turbine component being machined may be a finished gas turbine component or a partially finished or repaired gas turbine component. In certain embodiments, the gas turbine component is a gas turbine blade.

In certain embodiments, the gas turbine component is an internally cooled or internally air-cooled gas turbine blade. The gas turbine blade can be configured as a guide vane or blade of a turbine or of a compressor of an aircraft engine.

In certain embodiments, the plastic material is injected or applied in the liquid or viscous state. In certain embodiments, the plastic material is injected into the component, or alternatively, the first cavity can be sprayed with the plastic material.

The first cavity can be an opening or an opening extending into the interior of the gas turbine component, a channel or several cooperating channels in an arrangement, a chamber or a chamber system or be formed from them. In certain embodiments, the first cavity can also be a hole, in particularly a laser hole or a cooling (air) hole. In certain advantageous embodiments, it is proposed that the first cavity forms a type of channel, from which, in the finished state of the gas turbine blade, laser holes or cooling holes extend to the outer surface of these gas turbine blades. Such a first cavity, designed as a channel, can extend lengthwise; it can be curved or meander or run in some other way. The first cavity can have one or more undercuts. In an advantageous embodiment, the first cavity is produced in the context of a casting process.

The first cavity or first channel, in certain advantageous embodiments, has on its end an opening that is opened outward or main opening and is essentially closed on its other end.

Certain embodiments propose that the machining step or first machining step be conducted by means of a laser. This first machining step can be laser drilling. Through holes or cooling holes are introduced to the gas turbine component or blade with such laser drilling. Such cooling holes can be introduced, so that they connect the mentioned first cavity or first channel to the outside surface of the blade.

The mentioned plastic material can therefore be introduced into the first cavity or channel beforehand. The plastic material can be positioned in the first cavity along an imaginary extension of the generated laser holes or cooling holes, such that the plastic shields the opposite wall section of the channel or first cavity.

The plastic material, in a certain embodiments, is a plastic material that can be removed essentially free of residue. In certain advantageous embodiments the plastic material is polystyrene.

In a modification of the method according to the present technology, in which the already mentioned cooling holes are produced by laser drilling, it can be proposed that after laser drilling, the blade foot is tightened in a holding device with good heat conductivity or in copper jaws. This holding device or these copper jaws can be configured, for example, so that they have an oxygen or compressed air feed. The blade can then be configured, so that the first channel or the first cavity in the area of the blade foot is formed open outward or forms a main opening, in which the oxygen or compressed air feed is connected, so that oxygen or compressed air can be introduced, and specifically in order to carry out quality control, for example, in combination with a flow measurement or the like. A measurement device can be provided for such quality control in the context of which it is checked, in particular, whether laser or cooling openings are dimensioned in the desired manner.

It can be proposed, for elimination or removal of the plastic material or polystyrene from the component, that an induction coil or induction mat be placed around the component or blade, and that the coil heats the blade, the cavity or the blade channels. In certain embodiments, the blade, the cavity or the blade channels are flooded with oxygen or atmospheric oxygen at the same time as the heating. Heating can occur at a temperature in the range between 400° C. and 800° C., preferably in the range from 400° C. to 600° C., and especially at about 500° C. The aforementioned temperature values are particularly suitable, if the plastic material is polystyrene. Polystyrene then burns up or evaporates essentially free of residue.

It can also be prescribed that the blade then be cooled or rapidly cooled. This rapid cooling can occur via the copper jaws or the holding device, whose material preferably has good heat conductivity. Rapid cooling can occur, for example, with additional air or additional water, and specifically air or water that is guided to the copper jaws or holding device, whose material preferably has good heat conductivity. This can permit the blades to then be cooled relatively quickly, so that they can be grasped by hand, so that the process times in the production process for gas turbine blades can be reduced.

In certain embodiments, before filling of the first cavity with the plastic material, one or some holes or openings are introduced, so that they connect the outer surface of the blade to the mentioned cavity. Such holes or openings can be arranged, for example, on the end of the cavity facing away from the mentioned main opening. The introduced holes or openings, which can be generated by laser drilling, can help ensure that a closed, or essentially closed air-filled space is not formed, which can create an air cushion thereby preventing penetration of plastic into the corresponding section. Thus, during the filling of the component with plastic, the air can therefore escape through the aforementioned holes or openings.

It should be mentioned that the terms "first" and "second" machining step were chosen, in particular, to identify or for distinguish the machining steps, in which, in an advantageous embodiment, the second machining step occurs after the first machining step, if preferred modifications have both of these machining steps. However, before the first or between the first and the second machining step, one or more additional machining steps can also be conducted.

The gas turbine component or the blade is preferably made from a metallic or metal-containing material and/or from material containing cobalt and/or nickel (especially as base material or as matrix material) and is optionally coated or provided with a coating and/or alitized. Other materials, and especially materials that are used in the current state of the art for gas turbine components, particularly gas turbine blades, can be used as material for the gas turbine component or blade.

To perform the method or for machining, especially in the context of production or repair of the gas turbine component or components, particularly blades, a device can be used that is configured as follows, in combined or integrated form, and for which the applicant reserves protection: a laser; a holding device to hold the gas turbine component, which is configured in the aforementioned manner; an injection device to inject the plastic material, particularly for the injection of polystyrene; and a heating device to eliminate or remove the plastic material, configured, in particular, as an induction coil or induction mat or a device having such a coil or mat. In certain embodiments, the device can potentially having one or more of the following optional devices: an electronic control device to control the process for machining of the gas turbine component; a device for de-coating of the gas turbine component, which can be a laser; and a measurement device to measure or check the machining results produced by the method or to measure one or more characteristics of the gas turbine component. It can also be prescribed that an oxygen or compressed air feed device be provided, which is optionally combined in the aforementioned manner with the holding device.

Without limiting the present technology thereto, practical examples of the present technology will be further explained with reference to figures, which are identified below.

The components, systems and methods of present technology will be explained in accordance with the figures.

DETAILED DESCRIPTION OF THE INVENTION

Figure 1:
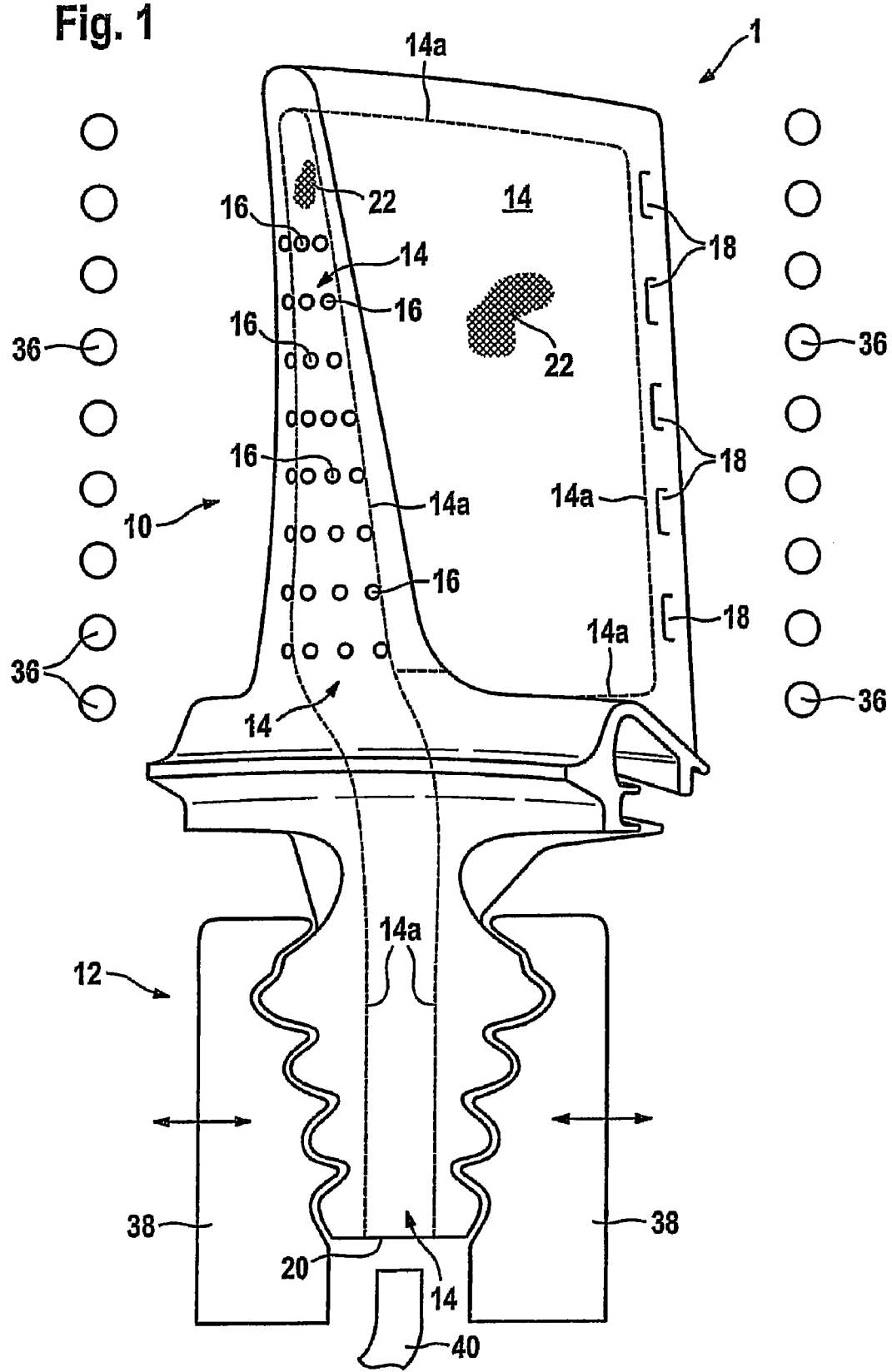
FIG. 1 depicts a gas turbine blade in accordance with an embodiment of the present technology.
Figure 2:
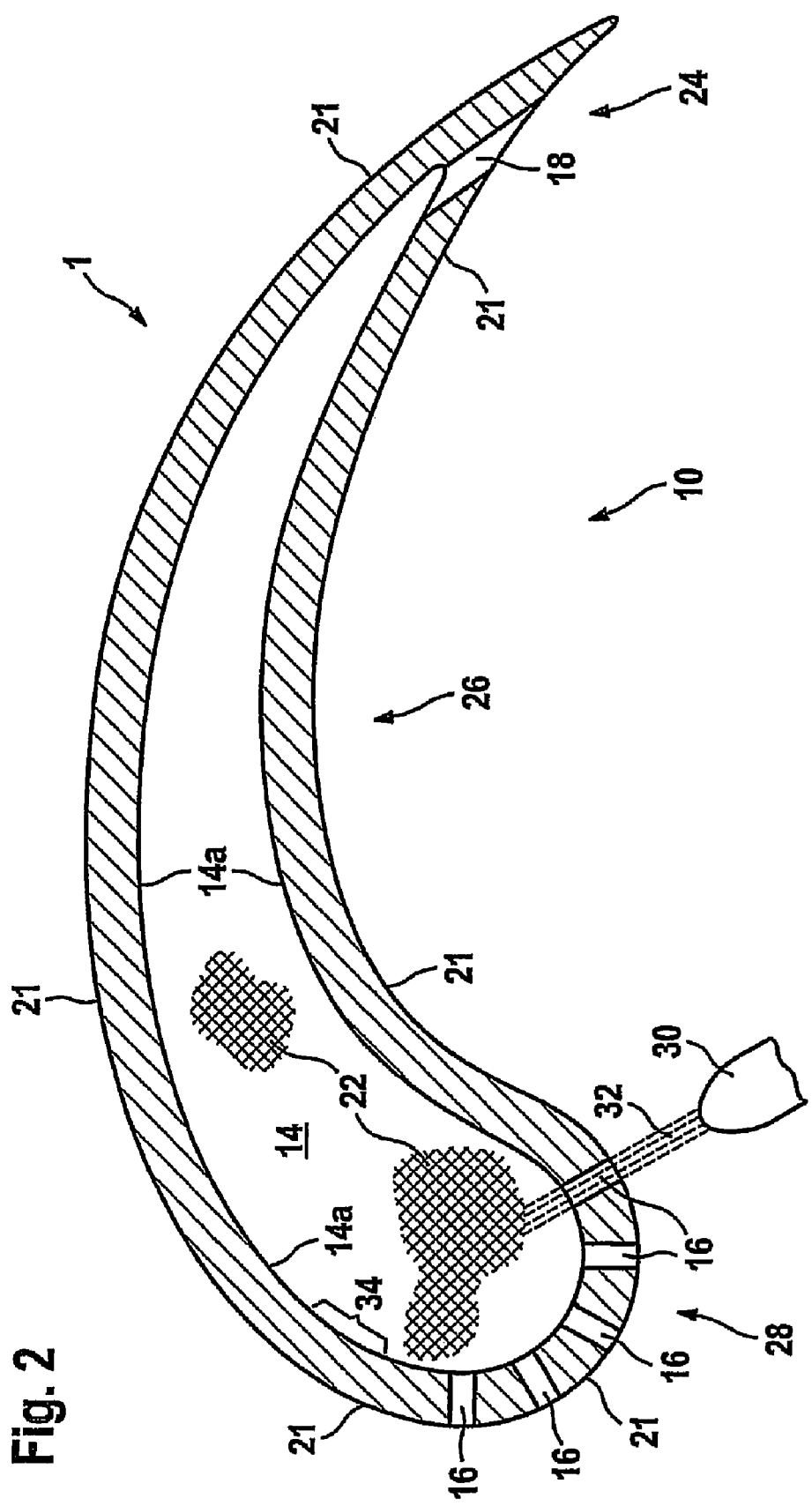
FIG. 2 depicts a flow profile schematic diagram of the blade depicted in FIG. 1.

A blade 1 of a gas turbine or aircraft engine is shown in FIGS. 1 and 2. This blade 1 is configured as a turbine blade. In other embodiments of the present technology, to which the following description can also apply, such a blade can also be configured as a guide vane of a gas turbine or aircraft engine or as a guide vane or blade of a compressor of a gas turbine or aircraft engine.

The blade 1 has a blade body 10 and a blade foot 12. The blade 1 also has a first inner cavity 14 or a first inner chamber or a first inner channel 14, whose wall or limitation is bounded in FIGS. 1 and 2 by the (dashed) lines 14a. This first inner cavity 14 can be provided with undercuts or have undercuts. The first inner cavity 14 discharges outward in the area of blade foot 12. The corresponding (main) opening 20 provided there in the region of the blade foot 12 is positioned, so that, in a blade 1 mounted in an aircraft engine, it is situated radially inward or in the radially inward arranged area of blade 1, referred to the turbine axis of rotation. According to a gas turbine part according to the present technology, which is a blade 1, in particular, it is prescribed that the first inner channel 14 or first cavity 14 be filled with a plastic material that can be removed free of residue, which, in certain embodiments can be polystyrene. This can be such that the first cavity 14 is filled essentially fully with the mentioned polystyrene.

The blade 1 depicted in FIGS. 1 and 2 also has a number of first openings 16, as well as a number of second openings 18. The openings 16, 18 extend from the outer surface 21 of blade 1 to the first inner cavity 14, and specifically in the area of blade body 10. The first openings 16 are configured here as holes, and specifically laser holes, and can also be referred to as cooling holes. The second openings 18 are configured here slit-like, but, as an alternative, can also be (laser) holes or the like.

The first inner cavity 14 is connected to the blade exterior via a main opening 20 of the first inner cavity 14, which, as already mentioned, is arranged here in the area of blade foot 12. The first inner cavity 14 is therefore connected to the exterior of the blade 1 only via the main opening 12, as well as (with respect to its cross section) relatively smaller openings 16, 18 arranged in the area of the blade body. The channel arrangement or cavity arrangement formed in this case serves for cooling or air-cooling. The blade 1 can receive relatively cold air into blade 1 in relation to the ambient temperature via the main opening 20, which then emerges via openings 16, 18. The "relatively" cold air can lie in the range of 700° C., which is relatively low in comparison with the temperatures that are produced by the combustion gases of an aircraft engine in the area connected to the combustion chamber.

It should be noted that the mentioned polystyrene is shown symbolically in cutouts by the cross-hatched areas 22.

A method in accordance with the present technology can occur as follows in a practical example.

A blade 1 provided with a first inner cavity 14 is initially produced. The blade 1 can be configured as shown in FIGS. 1 and 2 or explained with reference to these figures, in which, however, the openings 16, 18 are initially not present.

Second openings 18, which connect the outside of blade 1 to the first inner cavity 14, as is readily apparent in FIG. 2, where the flow profile or a section through the blade body 10 is shown, are then produced, for example, by means of a laser. The openings 18 can be positioned, as shown in FIGS. 1 and 2, in the area of the trailing edge 24 of blade 1, and specifically on the pressure side 26 there. As mentioned, the openings 18 can also have a shape different from that prescribed here.

Polystyrene 22 is then injected into hollow chamber 14 or the hollow chamber 14 is sprayed with polystyrene 22, which can occur through the second openings 18 and/or the main opening 20. Depending on whether it occurs via the main opening 20 or the second openings 18, it is ensured by the other openings 20 and 18 that no compressed air cushion builds up, which might prevent complete filing of the chamber 14 with polystyrene 22.

The first holes or cooling holes 16 are now produced by means of a laser. The holes 16 can therefore also be referred to as laser holes. These cooling holes 16 are arranged in the configuration according to FIGS. 1 and 2 in the area of the leading edge 28 of blade 1. The adverse and/or undesired effects of laser radiation on the wall section of the component, particularly the wall 14a bordering the first cavity 14 and opposite the forming holes 16, is prevented during laser drilling as a result of the first inner cavity 14 being filled with polystyrene 22 or a plastic material. This is schematically shown in FIG. 2 for one of the holes 16, in which a laser head is denoted with reference number 30, laser radiation is denoted with reference number 32 and an opposite wall section is denoted with reference number 34. As shown, the opposite wall section 34 is shielded by the polystyrene 22, therefore preventing an undesired effect of the laser radiation 2 on the opposite wall section 34, or a change, especially a permanent change, in the surface or material properties of this wall section 34.

In certain embodiments, the laser radiation 32, or its intensity, may be adjusted or set, so that, the polystyrene 22, sufficiently prevents the laser radiation 32 from having an effect on the (opposite) wall section 34 during laser drilling. It can then be stipulated that the act of laser radiation 32 can have an effect may evaporate, or partially evaporate the polystyrene 22.

When the laser has formed the holes 16 in the aforementioned manner, the polystyrene 22 is then removed again. This can occur by heating the polystyrene 22 and burning it or evaporating it. The corresponding heating of the polystyrene 22 can occur, for example, as schematically shown in FIG. 1, by means of an induction coil 36. In certain embodiments, copper jaws 38 are provided, in which the blade foot 12 can b e tightened. Such copper jaws 38, as schematically shown in FIG. 1, can have an oxygen or air feed or feed device 40, which can be connected to the main opening 20. It should be mentioned that, instead of the induction coil 36, an induction mat or another appropriate heating device can be provided. The coil 36 or mat is placed around the blade body and optionally the blade foot 12. The heating device or induction coil 36 heats the blade channels or their interior to 500° C. while the blade channels or their interior are flooded with oxygen or atmospheric oxygen via the oxygen or air pressure feed device 40. The polystyrene burns or evaporates essentially free of residue. Only water ($H_2O$), as well as carbon dioxide ($CO_2$) are then formed. It can also be prescribed that rapid additional cooling can occur with air or water via the copper jaws 38.

In certain embodiments, after removal of the polystyrene 22, the polystyrene 22 is injected again, such that that the openings 16, 18 are injected with the polystyrene 22 in addition to, or alternatively from the first cavity 14. In certain embodiments, a subsequent coating process, which can also be referred to as a second machining step, is performed, making it possible to coat the surface of blade 1 with a coating material, without the coating material penetrating into openings 16, 18, thereby changing their cross-sectional surface or even clogging them in the area of these openings 16, 18. After the corresponding coating process, through which a hot temperature-resistant layer of a corrosion-temperature-resistant layer or the like can be applied, the polystyrene 22 can be removed again in the aforementioned manner. It should be mentioned that the previously discussed second introduction of polystyrene 22 can occur via openings 16 and/or 18 and/or the main opening 20. It should also be noted that elimination or removal of the polystyrene 22 occurs in the practical example just described by heating, and specifically inductively. In certain embodiments, however, other removal methods can also be provided, for example, chemical removal methods.

As shown in the practical example, this permits the area of effect of tools or the area of effect that is present in the context of machining steps to be limited in simple fashion by use of polystyrene 22 or a corresponding plastic. It should be mentioned that the injection molding of polystyrene can be carried out quickly, cleanly and cost-effectively. Burning or evaporation of polystyrene is also free of residue, rapid, cost-effective and environmentally safe.

The present technology has now been described in such full, clear, concise and exact terms as to enable a person familiar in the art to which it pertains, to practice the same. It is to be understood that the foregoing describes preferred embodiments and examples of the present technology and that modifications may be made therein without departing from the spirit or scope of the present technology as set forth in the claims. Moreover, while particular elements, embodiments and applications of the present technology have been shown and described, it will be understood, of course, that the present technology is not limited thereto since modifications can be made by those familiar in the art without departing from the scope of the present disclosure, particularly in light of the foregoing teachings and appended claims. Moreover, it is also understood that the embodiments shown in the drawings, if any, and as described above are merely for illustrative purposes and not intended to limit the scope of the present technology, which is defined by the following claims as interpreted according to the principles of patent law, including the Doctrine of Equivalents. Further, all references cited herein are incorporated in their entirety.

The invention claimed is:

1. A method for machining gas turbine components to limit the area of the gas turbine component effected during the machining process comprising the following steps:
   preparing a gas turbine component having at least a first cavity;
   introducing a first plastic material into the first cavity;
   performing at least one first machining step on the gas turbine component; and
   thermally removing the plastic material from the first cavity,
   wherein the first plastic material is polystyrene and the first machining step is laser drilling, further wherein the laser drilling produces at least one laser hole in predetermined sections of a wall bordering the first cavity, the wall extending from the outer surface of the gas turbine component to the first cavity.

2. The method of claim 1, wherein said method for machining occurs during the production, repair or reconditioning of the gas turbine components.

3. The method of claim 1 wherein the first plastic material is introduced into the first cavity by way of injection.

4. The method of claim 1, wherein the first plastic material is positioned in the first cavity at a position on an imaginary extension between the at least one laser hole and a section of the wall bordering the first cavity opposite the laser hole, wherein the first plastic material provides shielding to the section of wall opposite the laser hole during laser drilling.

5. The method of claim 4, further comprising the steps of:
   introducing a second plastic material into at least one of a laser hole or laser holes, the first cavity, or the main opening of the first cavity;
   performing at least one second machining step on the gas turbine component; and
   removing the second plastic material,
   wherein the area of effect on the gas turbine component is limited during the second machining step.

6. The method of claim 5, wherein the first plastic material introduced into the first cavity before the first machining step is removed before the second plastic material is introduced into the at least one of the laser hole or laser holes, the main cavity, or the main opening of the first cavity.

7. The method of claim 6, wherein the second plastic material is introduced into at least one laser hole, and further wherein the at least one second machining step is a coating method partially or fully coating the outer surface of the gas turbine component with a coating material, and further wherein the second plastic material prevents the penetration of the coating material into the at least one laser hole.

8. The method of claim 5, wherein the second plastic material is introduced into at least one laser hole, and further wherein the at least one second machining step is a coating method partially or fully coating the outer surface of the gas turbine component with a coating material, and further wherein the second plastic material prevents the penetration of the coating material into the at least one laser hole.

9. The method of claim 5, wherein the second plastic material is removed thermally.

10. The method of claim 5, wherein the second plastic material is polystyrene 11. The method of claim 1, further comprising the steps of:
    introducing a second plastic material into at least one of a laser hole or laser holes, the first cavity, or the main opening of the first cavity;
    performing at least one second machining step on the gas turbine component; and
    removing the second plastic material,
    wherein the area of effect on the gas turbine component is limited during the second machining step.

12. The method of claim 11, wherein the first plastic material introduced into the first cavity before the first machining step is removed before the second plastic material is introduced into the at least one of the laser hole or laser holes, the main cavity, or the main opening of the first cavity.

13. The method of claim 12, wherein the second plastic material is introduced into at least one laser hole, and further wherein the at least one second machining step is a coating method partially or fully coating the outer surface of the gas turbine component with a coating material, and further wherein the second plastic material prevents the penetration of the coating material into the at least one laser hole.

14. The method of claim 11, wherein the second plastic material is introduced into at least one laser hole, and further wherein the at least one second machining step is a coating method partially or fully coating the outer surface of the gas turbine component with a coating material, and further wherein the second plastic material prevents the penetration of the coating material into the at least one laser hole.

15. The method of claim 11, wherein the second plastic material is removed thermally.

16. The method of claim 11, wherein the second plastic material is polystyrene.

* * * * *